(12) United States Patent
Oglesby et al.

(10) Patent No.: US 11,321,292 B2
(45) Date of Patent: May 3, 2022

(54) ACCUMULATION-BASED DATA OBJECT PROCESSING

(71) Applicant: Chicago Mercantile Exchange Inc., Chicago, IL (US)

(72) Inventors: Paul Oglesby, Brooklyn, NY (US); Kalle Tomas Thurin, Sollentuna (SE); Carl Erik Thornberg, Stockholm (SE)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 17/007,937

(22) Filed: Aug. 31, 2020

(65) Prior Publication Data
US 2022/0067009 A1 Mar. 3, 2022

(51) Int. Cl.
*G06F 16/22* (2019.01)
*H03M 7/30* (2006.01)
*G06F 16/28* (2019.01)

(52) U.S. Cl.
CPC ............ *G06F 16/22* (2019.01); *G06F 16/285* (2019.01); *H03M 7/30* (2013.01)

(58) Field of Classification Search
CPC ...................................... G06F 16/22
USPC ......................................... 707/693
See application file for complete search history.

(56) References Cited

U.S. PATENT DOCUMENTS

| 6,016,492 | A  | * | 1/2000 | Saxton  | G06F 40/103 707/707 |
| 8,494,953 | B1 | * | 7/2013 | Boberski | G06Q 40/04 705/37 |
| 8,533,101 | B2 | * | 9/2013 | Cheung  | G06Q 40/04 705/37 |

(Continued)

FOREIGN PATENT DOCUMENTS

EP 2960851 A1 12/2015

OTHER PUBLICATIONS

"Interest Rate Swaps Compression: A Progress Report", ISDA Study, Feb. 2012, 9 pages.

(Continued)

*Primary Examiner* — Alexandria Y Bromell
(74) *Attorney, Agent, or Firm* — Lempia Summerfield Katz LLC (57) ABSTRACT

A system includes first logic to obtain a fixed constituent data object and a variable constituent data object for each data object of a set of objects, second logic to analyze the fixed constituent data objects to allocate each fixed constituent data object to one of a plurality of fixed groups, third logic to analyze the variable constituent data objects to allocate each variable constituent data object to one of a plurality of variable groups, fourth logic to determine a net magnitude for each fixed group and for each variable group, fifth logic to determine a historical component for each variable constituent data object, sixth logic to determine a net historical magnitude for each variable group based on (Continued)

the historical components, and seventh logic to define at least one representative data object to represent the fixed and variable constituent data objects in each pair of fixed and variable groups having a matching common set of properties, the at least one representative data object maintaining the net magnitudes and maintaining the net historical magnitude.

22 Claims, 6 Drawing Sheets

(56) References Cited

U.S. PATENT DOCUMENTS

| | | | | |
|---|---|---|---|---|
| 2002/0091991 | A1* | 7/2002 | Castro | G06F 9/06 717/106 |
| 2003/0083978 | A1* | 5/2003 | Brouwer | G06Q 40/04 705/37 |
| 2005/0256799 | A1* | 11/2005 | Warsaw | G06Q 40/04 705/37 |
| 2010/0241551 | A1* | 9/2010 | Brouwer | G06Q 10/0637 705/37 |
| 2010/0325030 | A1* | 12/2010 | Brouwer | G06Q 10/0637 705/37 |
| 2011/0276460 | A1* | 11/2011 | Brouwer | G06Q 40/00 705/37 |
| 2011/0276461 | A1* | 11/2011 | Brouwer | G06Q 40/04 705/37 |
| 2012/0023002 | A1* | 1/2012 | Brouwer | G06Q 40/04 705/37 |
| 2012/0023003 | A1* | 1/2012 | Brouwer | G06Q 40/00 705/37 |
| 2012/0303509 | A1* | 11/2012 | Brouwer | G06Q 40/00 705/37 |
| 2015/0262305 | A1* | 9/2015 | Bawadhankar | G06Q 40/06 705/36 R |

OTHER PUBLICATIONS

Extended European Search Report from EP Application No. 21193452, dated Jan. 18, 2022, 11 pages.

* cited by examiner

ACCUMULATION-BASED DATA OBJECT PROCESSING

BACKGROUND

While costs associated with computers and memory storage products have been falling with technological improvements, available computing resources remain at a premium. For example, the processing of electronic communications has led to substantial increases in necessary memory usage and computing processing power. In many cases, computing centers tasked with implementing and maintaining these electronic communications are constrained by existing or aging hardware and software resources, and budgetary concerns regarding the purchase, upgrade, or repair of the hardware and software infrastructure components.

With the ever-increasing amount of data being processed, computing resources, such as memory and/or other storage, may be depleted and additional resources may need to be added to the system. Additionally, the data stored may be communicated between computing systems for processing. These communication requirements may result in slowed communications capability, as communication bandwidth on an organization's network may be a finite, limited resource.

For these and other reasons, improvements to data management capabilities, including intelligent compression of data, are warranted. The compression should be intelligent in the sense that the compression only removes data that is redundant or otherwise indicative of unnecessary information. In that way, data indicative of information of value is maintained despite the data compression.

DETAILED DESCRIPTION

Methods and systems of compressing or otherwise processing a set of data objects are described. The processing of the disclosed methods and systems is directed to defining one or more representative data objects for data objects that fall within groups suitable for compression. Representing the groups of data objects with a single data object (or other low number of data objects) allows the set of data objects to be compressed, or otherwise adjusted in a manner that reduces the number of data objects in the set. The disclosed methods and systems may be configured to find an optimal adjustment to achieve a maximum compression or reduction, e.g., reduction of the number of data objects. For example, the optimal adjustment may minimize the number of data objects in the set.

The processing of the disclosed methods and systems is, in some embodiments, configured to allow more data objects to be compressed into the one or more representative data objects. To this end, the disclosed methods and systems are configured to allow more data objects to be eligible or suitable for inclusion in the groups to be compressed. As described below, data objects that would otherwise not have been eligible or otherwise suitable for compression are included in the processing. Without the processing of the disclosed methods and systems, data objects without a common timing, such as a common start date, would not have been eligible for compression. In contrast, data objects with different start dates may nonetheless be compressed or otherwise processed to reduce the number of data objects in the set.

These and other aspects of the disclosed methods and systems present technical solutions to the technical problems presented by the processing of sets of data objects. For instance, one technical problem involves data object sets that are excessively large. The size of the data object set presents storage and other processing requirements and challenges. However, indiscriminate deletion of data objects to reduce the size of the data object set is not possible, insofar as information will be lost. Therefore, the technical problem also involves finding an intelligent way to reduce the size of the data object set. The disclosed methods and system provide an intelligent procedure for reducing the size of the data object set (e.g., the number of data objects in the set) to provide solutions to such storage and processing challenges without incurring detrimental information loss.

Yet another technical benefit providing by the disclosed methods and systems involves a reduction in communications or other data transmissions regarding the data objects defined to be representative of the data objects being compressed. Once the representative data objects are incorporated into the data object set, network traffic and network processing loads will decrease.

The disclosed methods and systems may be implemented in connection with coupon blending and other types of compression procedures, including, for instance, other risk neutral compression procedures, involving data object sets representative of financial positions. Each financial position is created by a trade or transaction, such as an interest rate swap. In the case of interest rate and other swap trades, each trade may create two positions, or legs, e.g., a "receive" position and a "pay" position for the incoming and outgoing cash flows, respectively. Coupon blending involves a single party (e.g., a bank) attempting to lower the size of a portfolio while remaining cash flow neutral. The cash flows thus remain the same, but the gross notional amount of funds involved in the positions of the portfolio is lowered. The disclosed methods and systems are also useful in compression scenarios involving multiple parties. So-called multilateral compression involves compressing the portfolios of more than one party in accordance with risk constraints specified by each party. The risk constraints specify the degree to which the party's cash flows and/or other risk parameters (e.g., bucketed interest, delta, etc.) may deviate from a cash flow neutral adjustment. The multilateral compression is usually provided in a manner that is risk neutral for a central or other controlling party, such as a clearinghouse (e.g., central counterparty clearinghouse, or CCP) or exchange. Keeping the CCP cash flow or risk neutral may thus be another constraint on the optimization implemented by the disclosed methods and systems.

The disclosed methods and systems may be considered to implement an accrual or other accumulation of historical components of variable constituent data objects. The accumulation of the historical components allows variable constituent data objects with different histories (e.g., different start dates or other timing) to nonetheless be grouped together for compression or other data object set adjustments. The accumulation of the historical components generally allows additional data objects to be eligible for, or incorporated into, an optimization that finds the optimal compression or other adjustment(s), thereby increasing the efficiency of the compression or other data set adjustment(s).

The disclosed methods and systems may be used in financial applications other than coupon blending and multilateral compression. For instance, the disclosed methods and systems are not limited to risk-free netting compression. The compression may involve any number of parties. The disclosed methods and systems may thus be used to increase the efficiency of a wide variety of compression scenarios.

A financial instrument trading system, such as a futures exchange, referred to herein also as an "exchange", such as the Chicago Mercantile Exchange Inc. (CME), provides a contract market where financial instruments, for example futures and options on futures, are traded. The term "futures" is used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time.

Typically, the exchange provides for a centralized "clearinghouse" through which all trades made must be confirmed, matched, and settled each day until offset or delivered. The clearinghouse is an adjunct to the exchange, and may be an operating division of the exchange, which is responsible for settling trading accounts, clearing trades, collecting and maintaining performance bond funds, regulating delivery, and reporting trading data. One role of the clearinghouse is to mitigate credit risk. Clearing is the procedure through which the clearinghouse becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearinghouse.

An interest rate futures contract, also referred to as an interest rate future, is a futures contract having an underlying instrument/asset that pays interest, for which the parties to the contract are a buyer and a seller agreeing to the future delivery of the interest bearing asset, or a contractually specified substitute. Such a futures contract permits a buyer and seller to lock in the price, or in more general terms the interest rate exposure, of the interest-bearing asset for a future date.

An interest rate swap ("IRS") is a contractual agreement between two parties, i.e., the counterparties, where one stream of future interest payments is exchanged for another, e.g., a stream of fixed interest rate payments in exchange for a stream of floating interest rate payments, based on a specified principal amount. An IRS may be used to limit or manage exposure to fluctuations in interest rates. One common form of IRS exchanges a stream of floating interest rate payments on the basis of the 3-month London interbank offered rate for a stream of fixed-rate payments on the basis of the swap's fixed interest rate. Another common form of IRS, knows as an overnight index swap, exchanges at its termination (or at other intervals, e.g., every three months) a floating rate payment determined by daily compounding of a sequence of floating interest rates on the basis of an overnight interest rate reference (e.g., the US daily effective federal funds rate, or the European Overnight Index Average (EONIA)) over the life of the swap, for a fixed rate payment on the basis of daily compounding of the overnight index swap's fixed interest rate over the life of the swap. In some cases (e.g., a zero coupon overnight index swap), there is only a single payment at maturity. In other cases (e.g., a regular overnight index swap), payments are made at regular intervals.

An interest rate swap futures contract is one in which the underlying instrument is an interest rate swap. As such, an interest rate swap futures contract permits "synthetic" exposure to the underlying interest rate swap, i.e., without entailing actual ownership of the underlying IRS.

In a typical futures trading environment, the standardization of futures contracts and the nature of the central counterparty based trading system allows an exchange, or market participant thereof, to net together offsetting positions in the same contract for the purpose of reducing the margin requirement to reflect the reduced risk of loss of such positions and/or to outright consolidate positions to reduce the size of the portfolio and/or reduce transaction fees therefore. As the exchange, being a central counterparty to all transactions, ensures that each counterparty is not at risk of loss due to the default of the other party, such netting and consolidation by one market participant does not affect the positions and risk undertaken by another participant.

In the case of IRS contracts, however, the variability in the characteristics of positions which may exist in any given portfolio, such as the maturity date, coupon, etc., may make it difficult to identify suitable positions for netting though, for example, such positions, though not identical, may exist which are similar enough as to represent a reduced risk of loss meriting a reduction in the margin requirement. Further complicating this process is the bilateral nature of an IRS contract where a particular position of one party is coupled with a counter position of a counterparty thereto. For instance, an adjustment to improve one party's portfolio may affect the portfolio of the counterparty, in which case adjustments to the counterparty's portfolio may become necessary. Further, as described above, positions in IRS contracts, and in particular, various combinations of positions therein, are typically undertaken to serve particular economic purposes, such as to achieve a particular risk exposure or risk profile, which may be unique to that market participant. Accordingly, IRS contract positions within a particular portfolio may not be consolidated without necessarily affecting not only the economic purpose intended by the market participant holding that portfolio but also the economic purposes which may be different, of any counter party market participants thereto.

Although described in connection with examples involving data objects representative of interest rate swap (IRS) and inflation swap trades, the disclosed methods and systems are useful in connection with other types of data objects. For instance, the data objects may be representative of other types of trades or transactions, including, for instance, various types of credit default swap transactions. Still other types of data objects may be processed by the disclosed methods and systems, including, for instance, other data storage or processing systems for which data compression is useful. The types, sources, and other characteristics of the data objects may vary accordingly.

As discussed above, some IRS trades are contractual agreements between two parties, i.e., the counterparties, where one stream of future interest payments is exchanged for another, e.g., a stream of fixed interest rate payments in exchange for a stream of floating interest rate payments, based on a specified principal amount. An IRS may be used to limit or manage exposure to fluctuations in interest rates. One common form of IRS exchanges a stream of floating interest rate payments on the basis of the 3-month London interbank offered rate for a stream of fixed-rate payments on the basis of the swap's fixed interest rate. Other types of IRSs exchange other floating rate payments over the timespan of the swap for a fixed rate payment.

Due to the nature of interest rate swap trading, a given portfolio may include a large number of trades, and thus a large number of individually unique positions, also referred to as line items. Each swap trade presents a pay position and a receive position for each party to the trade. A pay position may specify a stream of payment obligations, such as pay 5% fixed on a notional amount (e.g., $5 million (M)) over a certain time at a particular period pay period. A receive position in such cases specifies a stream of incoming payments, such as receive floating interest rate payments on a notional amount (e.g., $5M) over a certain time at a particular pay period. Each portfolio may include a large number of similar, but not identical, positions. As a result, a new function for clearinghouses to net similar but not identical line items is warranted. The exchange or central counterparty has robust capability to allow a trader to initiate a position (e.g., buy or sell) or unwind the same position (e.g., sell or buy), where unwinding a position may be understood to have an opposing or counter effect as initiating a position. However, the central counterparty has no mechanism to group positions by similar characteristics and then eliminate overlapping line items. In some cases, compression may involve or refer to netting non-identical line items.

Compression generally reduces the notional value of economically offsetting positions without having to necessarily unwind exactly the same position that was initiated. Previous systems have employed compression generally in dealer-to-dealer trading. Given the homogeneity of the user base in existing systems, previously there was little need for systems to accommodate unique compression criteria. However, as the user base for cleared IRS grows, so too do the differences in compression criteria, and the need to pair large numbers of potentially disparate users.

Further, as described herein, positions in one portfolio cannot necessarily be netted or consolidated without affecting counter-positions held in the portfolios of the counterparty market participants thereto which may have different criteria for determining nettable/consolidatable positions according to their unique economic purpose. In addition, the exchange or central counterparty may prohibit or inhibit each market participant from being privy to the portfolios and/or criteria of other market participants so as to preserve the anonymity thereof.

Some types of swap transactions are considered to be periodic in the sense that the trades are reset at regular intervals. For example, once a year such transactions will lose the memory or records of past states, and start collecting records of states again, until the transactions are reset the next time. In some cases, periodic transactions only maintain one single record which is collected at the reset. Alternatively, the periodic transaction accumulates volatile records, e.g., daily, where the accumulated collection establishes the state.

One example of periodic transactions is interest rate swaps (IRS) with a rolling pay period. For instance, an IRS on 3M EURIBOR that pays every third month is one example of a transaction with only a single record. An IRS on SONIA that pays every third month is one example of a transaction that accumulates multiple records due to the daily compounding of SONIA.

With periodic transactions, the dependency on the start date of the transactions is removed as long as the transactions have the same phase (or other event timing), because the transactions are equal since the last reset. As a result, such transactions may be compressed in a coupon blending, multi-lateral, or other compression, such as in a CCP, where cash flow neutrality needs to be maintained. In this way, two periodic records (or other data objects) that have the same end date, and fulfill other criteria for being netted together, are eligible for netting even though the start dates may differ. With such periodic data objects, it does not matter that one transaction may be older because the older states are no longer relevant.

The disclosed methods and systems may be used to address the efficiency challenges presented when the data objects are non-periodic. Non-periodic transactions (or other data objects) accumulate volatile records or states throughout the length of the transaction, such that payments or settlements are dependent on the history, e.g., start date, of the transactions. One example of a non-periodic transaction is a zero coupon overnight index step in the Brazilian Real (BRL) swap market. Without the disclosed methods and systems, trades with different histories have not been grouped together for possible compression, thereby creating a very fragmented population for compression. The efficiency of compressing BRL and other non-periodic swaps or transactions is otherwise low (or lower) because, for instance, only those non-periodic transactions having a common start date and a common end date can be grouped together for possible compression.

While the disclosed embodiments may be discussed in relation to certain types of swap contracts or trades, it will be appreciated that the disclosed embodiments may be applicable to other bilateral contracts, or other multilateral relationships. For instance, the disclosed methods and systems may also be useful in connection with other types of swap trades, including, for instance, those involving cash flows, such as basis swaps, constant maturity swaps, and cross-currency swaps. The disclosed methods and systems may be used in connection with any other market now available or later developed.

In some cases, the compression provided by the disclosed methods and systems may be initiated and otherwise implemented automatically. For example, the disclosed methods and systems may be configured to automatically process a set of data objects upon the detection of a trigger event or condition, such as a set of data objects exceeding a data size threshold. Alternatively or additionally, the disclosed methods and systems may be configured to automatically evaluate sets of data objects for compression, e.g., on a periodic or regular basis.

Figure 1:
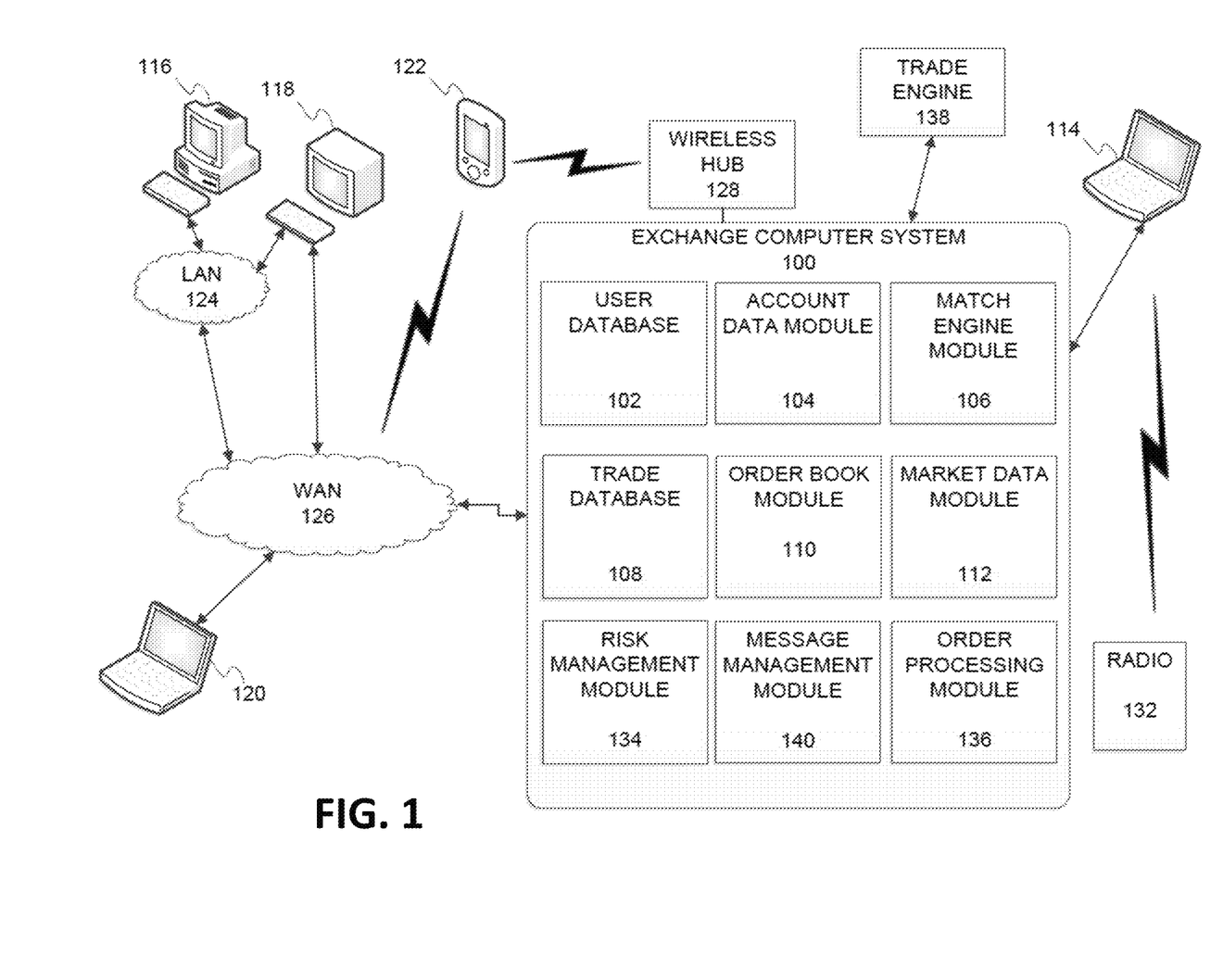
FIG. 1 depicts an illustrative computer network system that may be used to implement aspects of the disclosed embodiments.

FIG. 1 depicts a trading network environment for implementing trading systems and methods with credit control in accordance with one example. In this case, an exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herein unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided, which may process account information that may be used during trades and/or credit control, as described below. A match engine module 106 may be included to match bid and offer prices and may be implemented with software that executes algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users.

A risk management module 134 may be included to compute and determine a user's risk utilization in relation to the user's defined risk thresholds. In some cases, the risk management module 134 may be used to implement provide other services, such as compression-related and other data object set processing services, examples of which are described herein, and as will be addressed in connection with the example of FIG. 2.

An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

Any number of the above-described trading system components may be used or otherwise involved in implementation of the data object set processing of the disclosed methods and systems.

The trading network environment shown in FIG. 1 includes example computer devices 114, 116, 118, 120 and 122 which depict different example methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An example computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The example computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the example computer device 114 or a user thereof. The user of the example computer device 114, or the example computer device 114 alone and/or autonomously, may then transmit the trade or other information to the exchange computer system 100.

Example computer devices 116 and 118 are coupled with the local area network ("LAN") 124, which may be configured in one or more of the well-known LAN topologies, e.g. star, daisy chain, etc., and may use a variety of different protocols, such as Ethernet, TCP/IP, etc. The example computer devices 116 and 118 may communicate with each other and with other computer and other devices, which are coupled with the LAN 124. Computer and other devices may be coupled with the LAN 124 via twisted pair wires, coaxial cable, fiber optics or other wired or wireless media. As shown in FIG. 1, an example wireless personal digital assistant device ("PDA") 122, such as a mobile telephone, tablet based computer device, or other wireless device, may communicate with the LAN 124 and/or the Internet 126 via radio waves, such as via WiFi, Bluetooth and/or a cellular telephone based data communications protocol. The PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Example computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As described above, the users of the exchange computer system 100 may include one or more market makers that may maintain a market by providing constant bid and offer prices for a derivative, security, or other financial product to the exchange computer system 100, such as via one of the example computer devices depicted or otherwise described herein. The exchange computer system 100 may also exchange information with other trade engines, such as trade engine 138.

The operations of computer devices and systems shown in FIG. 1 may be controlled by computer-executable instructions stored on a computer-readable storage medium (as opposed to computer-readable communication media involving propagating signals) or a non-transitory computer-readable storage medium. For example, the example computer device 116 may include computer-executable instructions for receiving order information from a user and transmitting that order information to exchange computer system 100. In another example, the example computer device 118 may include computer-executable instructions for receiving market data from exchange computer system 100 and displaying that information to a user.

One or more additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

The exchange computer system 100 may be configured to implement the data object set compression or other processing of the disclosed embodiments in connection with swap and/or other trades. In such cases, each trade corresponds with a data object. A set of data objects may correspond with a portfolio of a party, such as a bank. The processing of the set of data objects may then involve or include compression of the portfolio. The compression may be unilateral, and directed solely to the portfolio of a single party, e.g., as in coupon blending. The compression may alternatively be multilateral, when the compression involves the portfolios of multiple parties. Thus, in multilateral cases, the set of data objects processed by the disclosed embodiments includes the portfolios of the multiple parties.

In some embodiments, the data object set processing may begin with obtaining the set of data objects to be compressed or otherwise processed. For example, the data objects may be obtained from the account data module 104, the trade database 108, and/or other component of the exchange computer system 100. Each data object may be then be separated into constituent data objects, i.e., a fixed constituent data object and a variable constituent data object. Alternatively or additionally, the fixed constituent data objects and the variable constituent data object may be obtained. Further details regarding examples of the fixed and variable constituent data objects are provided below in connection with FIG. 5.

In the example of FIG. 1, compression services provided by the disclosed embodiments may be implemented as part of, or otherwise in connection with, the risk management module 134 and/or another module or component of the exchange computer system 100. Other module(s) and/or exchange computer systems may be used to provide the compression service(s). For example, the disclosed embodiments may be implemented by the module(s) and/or exchange computer systems described in U.S. Pat. No. 8,494,953 ("Interest rate swap compression match engine"), U.S. Patent Publication No. 2015/0262305 ("Coupon blending of swap portfolio"), and U.S. application Ser. No. 15/812,573 ("Listed options position compression system"), the entire disclosures of each of which are hereby incorporated by reference and relied upon. Alternatively or additionally, the disclosed embodiments may be implemented in connection with another computer system, such as the computer system of a third-party service provider engaged by a market participant for data object set processing, including, for example, a compression vendor. In still other cases, the disclosed embodiments may be implemented by an entity, e.g., a bank, holding or otherwise controlling the portfolio (or set of data objects) to be compressed or otherwise processed.

The disclosed methods and systems, in some embodiments, provide the ability to improve (e.g., automatically increase) the grouping of constituent data objects in risk-free and other compressions, e.g. coupon blending, which results in a smaller data representation of a portfolio (e.g., swap portfolio), and may also be associated with a lower capital charge for parties (e.g., banks). From a technical perspective, use of the disclosed methods and systems for portfolio compression results in fewer redundant cash flow records and transactions stored, maintained and administered to represent a net portfolio. Reducing the number of records provides the technical benefit of lowering the storage and processing load of the exchange computer system 100 and/or other computer systems involved in the transactions, thereby improving the speed and other performance parameters of such systems. The compression may lead to fewer communications or other data transmissions, thereby lowering network traffic or other network loads.

Figure 2:
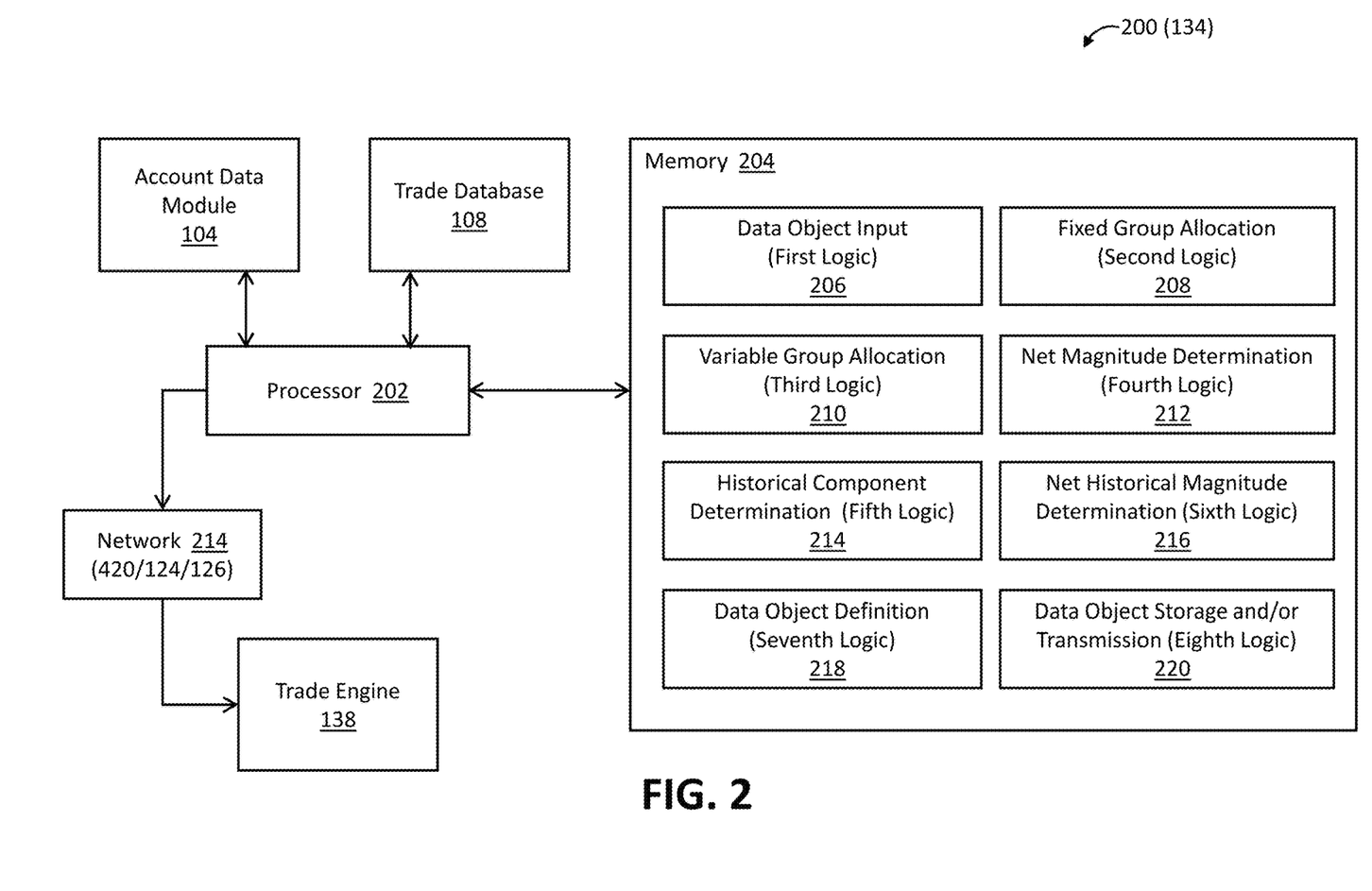
FIG. 2 is a block diagram of a system for processing a set of data objects in accordance with one example.

FIG. 2 depicts a system 200 for processing a set of data objects. The system 200 may correspond with some or all of the components of the trading environment or exchange computer system described above in connection with FIG. 1. For instance, one or more elements of the system 200 may be or otherwise correspond with the risk management module 134 (FIG. 1). In this case, the system 200 includes a processor 202 and a memory 204 that may be part of the risk management module 134 and/or another module or processor. In some cases, the processor 202 is or includes a customized processor, rather than a general-purpose processor or generic processor. For instance, the customized processor may include one or more hardware components, e.g., a field programmable gate array (FPGA), configured to implement one or more aspects of the disclosed methods or systems.

In the example of FIG. 2, the set of data objects processed by the system 200 are representative of swap or other trades. The processor 202 may accordingly be in communication with the trade database 108 to obtain the set of data objects and effectuate adjustments thereto. Alternatively or additionally, the processor 202 communicates with the account data module 104 and/or the trade engine 138 to obtain and/or adjust the set of data objects. In some cases, such communications to and from the processor 202 may be implemented via the distributed network 214.

The memory 204 is coupled with the processor 202 to provide access to computer-executable instructions stored on the memory 204. The instructions are directed to the data object set processing described herein. In this example, the memory 204 includes eight sets of instructions arranged in respective logic units stored therein. Each logic unit is executable by the processor 202. The number of logic units or instructions sets may vary. For example, the instruction sets may be integrated with one another to any desired extent. Alternative instructions may also be included.

The system 200 includes first logic 206 that, when executed by the processor 202, causes the processor 202 to obtain a fixed constituent data object and a variable constituent data object for each data object of a set of objects. In some cases, the set of data objects is obtained. Each data object is then separated into the fixed and variable constituent data objects specified thereby. In other cases, the fixed and variable constituent data objects are obtained directly. Obtaining the set of data objects and/or the constituent data objects may involve or otherwise include constituent data streams includes accessing a memory. Alternatively or additionally, obtaining the data objects or the constituent data objects may include receiving data from one or more data sources, such as one of the above-referenced computer systems associated with a portfolio of trades.

The system 200 includes second logic 208 that, when executed by the processor 202, causes the processor 202 to analyze the fixed constituent data objects to allocate each fixed constituent data object to one of a plurality of fixed groups. The fixed constituent data objects in each fixed group of the plurality of fixed groups have a common set of properties.

The properties of the constituent data objects may be established by one or more properties of the data object. For instance, each data object may have a start timing (e.g., date), an end timing (e.g., date), and an event timing (e.g., day of the month or other periodic date).

The common set of properties may accordingly include one or more timing-related properties. For instance, in trade cases, examples of timing properties that the constituent data objects have in common include an end timing (e.g., date), a phase or event timing (e.g., events that occur on the 15th of each month), a day-count methodology, and/or a business day determination methodology. Additional or alternative properties may be considered or used. For example, one property may be directed to establishing a business or other calendar that identifies business holidays (e.g., a U.S. calendar, a British calendar, etc.).

The system 200 includes third logic 210 that, when executed by the processor 202, causes the processor 202 to analyze the variable constituent data objects to allocate each variable constituent data object to one of a plurality of variable groups. As described above with the fixed groups, the variable constituent data objects in each variable group of the plurality of variable groups have a common set of properties. The same types of properties may be considered or used in connection with both the fixed groups and the variable groups.

The variable constituent data objects in the variable groups may not have one or more historical properties in common. For example, the variable constituent data objects in a variable group may have different start dates. As a result, the different start dates will, all other things being equal, result in different historical components for the variable constituent data objects. However, and as explained further below, the variable constituent data objects with different histories can nonetheless be allocated to the same variable group for compression.

The system 200 includes fourth logic 212 that, when executed by the processor 202, causes the processor 202 to determine a net magnitude for each fixed group of the plurality of fixed groups and for each variable group of the plurality of variable groups. The net magnitudes may be determined by netting the individual magnitudes of the constituent data objects in each group. For instance, in some financial cases, the fourth logic 212 is configured to further cause the processor 202 to determine, for each fixed group, a magnitude for each fixed constituent data object in the fixed group based on a notional transactional level for the fixed constituent data object and a coupon rate for the fixed constituent data object. That is, a fixed magnitude may be calculated as a product between notional and fixed rate. In such financial cases, for the variable groups, the fourth logic 212 is configured to further cause the processor 202 to determine, for each variable group, a magnitude for each variable constituent data object in the fixed group, e.g., as a notional magnitude or otherwise based on the notional transactional level for the variable constituent data object.

The system 200 includes fifth logic 214 that, when executed by the processor 202, causes the processor 202 to determine a historical component for each variable constituent data object. In some cases, the fifth logic 214 is configured to further cause the processor 202 to determine the historical component for each variable constituent data object based on a series of data events since a start date of the data object. Each data event may be or otherwise include a reading or other capturing of a rate (e.g., an interest rate) or other magnitude. Alternatively or additionally, the historical component is representative of a data event occurring on a start date of the data object. For instance, the data event may establish an initial interest rate, or an index magnitude, such as an inflation index.

The system 200 includes sixth logic 216 that, when executed by the processor 202, causes the processor 202 to determine a net historical magnitude for each variable group of the plurality of variable groups based on the historical components of the variable constituent data objects in the variable group.

The system 200 includes seventh logic 218 that, when executed by the processor 202, causes the processor 202 to define at least one representative data object to represent the fixed and variable constituent data objects in each pair of fixed and variable groups having a matching common set of properties. The one or more representative data objects maintains the net magnitudes of the fixed group and the variable group. The one or more representative data objects also maintains the net historical magnitude of the variable group. In cases in which multiple data objects cumulatively maintain the net magnitudes, maintaining the net magnitudes involves or otherwise includes defining the representative data object(s) such that the representative data object(s) has/have a cumulative fixed magnitude, a cumulative variable magnitude, and a cumulative historical magnitude equal to the net magnitude of the fixed group, the net magnitude of the variable group, and the net historical magnitude of the variable group, respectively. For example, in some financial cases, the representative data object(s) has a cumulative fixed magnitude and a cumulative variable magnitude such that future net magnitudes (e.g., future cash flows or other payment events) of the fixed group and the variable group are replicated by the representative data object(s). In other cases (e.g., situations without absolute risk neutrality), maintaining the net magnitudes may allow for non-equality within a predetermined offset or allowance.

In some cases, the seventh logic is configured to further cause the processor 202 to implement an optimization procedure to define the one or more representative data objects. The optimization procedure may be used to minimize the number of representative data objects and/or minimize one or more magnitudes of the representative data objects. Further details regarding the optimization procedure are provided below in connection with a number of examples.

The optimization procedure may be or include a linear optimization. The linear optimization may be configured to minimize a total magnitude presented by the set of data objects after the adjustments, while satisfying one or more constraints on the linear optimization. In trade examples, the problem solved by the linear optimization may be characterized as selecting the representative data object(s) that result(s) in using the least amount of notional while still satisfying the constraints. The nature of the total magnitude minimized by the linear optimization may vary in accordance with the nature of the data objects or data streams. The optimization procedure may select or otherwise define the representative data object(s) via manipulation of existing data objects and/or via introduction of new data objects that were not part of the initial set.

The system 200 includes eighth logic 220 that, when executed by the processor 202, causes the processor 202 to store the representative data object(s) in a data store. The storage of the representative data object(s) may effectuate an adjustment to the set of data objects such that a number of data objects in the set of data objects is reduced. For example, data indicative of the adjustments may be stored in a memory of the exchange computer system 100 (FIG. 1), such as the trade database 108 (FIG. 1). For instance, the incorporation may involve or otherwise include modifying a spreadsheet or other data structure or record in which the data object set is presented. In such cases, one or more acts associated with the adjustments, such as execution of trades, may occur subsequently or separately. In some cases, such storage may involve or otherwise include storing the modified spreadsheet or other data structure in the memory. Alternatively or additionally, the data indicative of the adjustments may be transmitted to a module of the exchange computer system 100, such as the trade engine 138 (FIG. 1) for execution of one or more trades. In some cases (e.g., when a processor of the exchange computer system is implementing the eighth logic 220), the eighth logic 220 may cause the processor 202 to execute the one or more trades (e.g., complete the financial transaction(s) associated with the trade).

Additional or alternative logic sets may be included. For instance, the system 200 may include a logic set dedicated to implementing an optimization procedure for defining the representative data object(s).

Further details regarding the functionality provided via execution of the above-described logic units, and by the system 200 more generally, are provided in connection with the examples described below.

Figure 3:
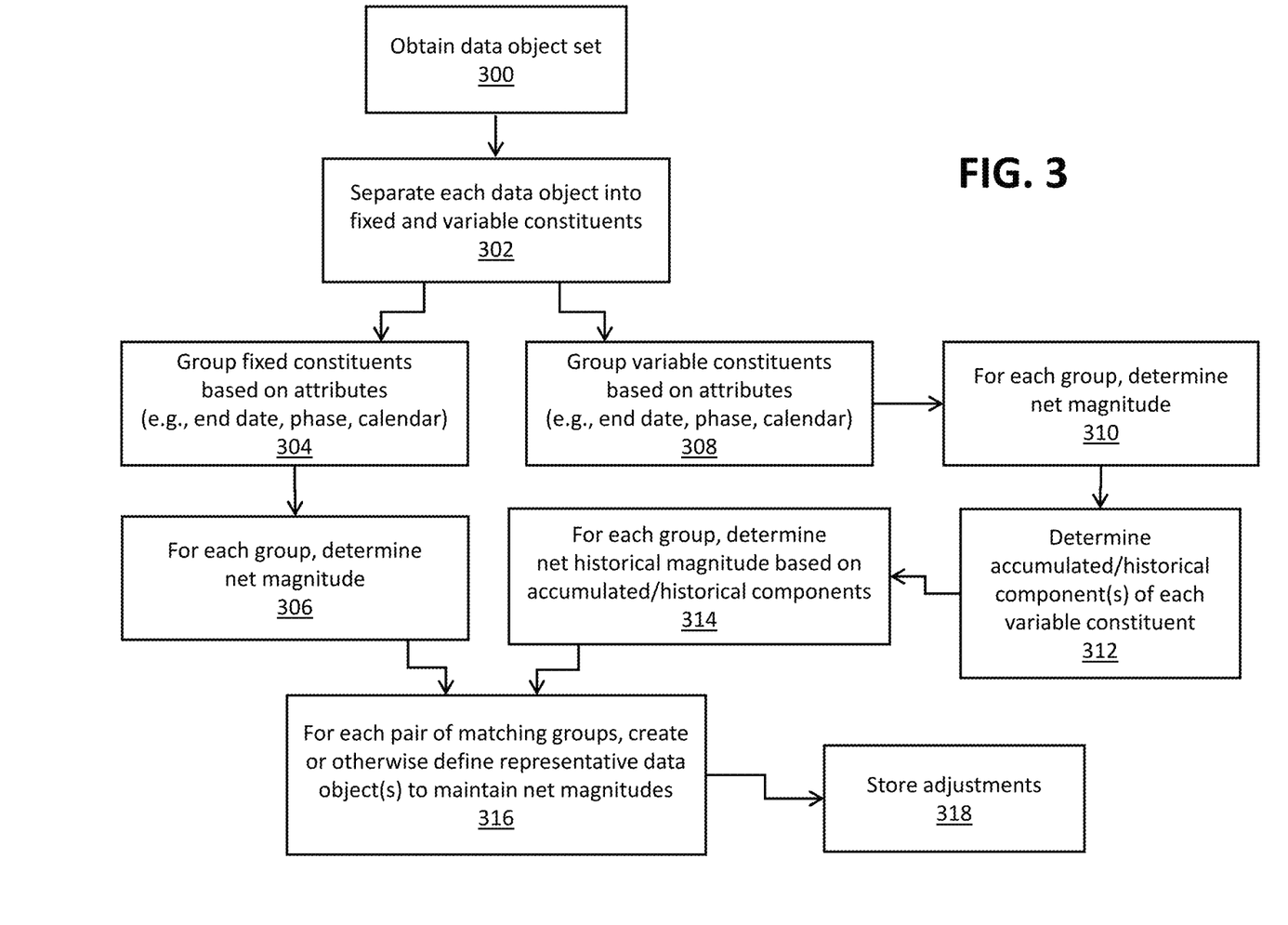
FIG. 3 is a flow diagram of a method for processing a set of data objects in accordance with one example.

FIG. 3 depicts a computer implemented method for processing a set of data objects. The method may show an example of the operation of the system 200 of FIG. 2, or another system.

Each act of the method is implemented by a processor, such as the processor 202 in the example of FIG. 2, a processor of the exchange computer system 100 in the example of FIG. 1, and/or another processor. The processor may be a processor used to implement a risk management module and/or another management processor. The processor may include any number of processors, such as processing cores or units, and may be disposed in any arrangement.

The method may begin with one or more acts directed to obtaining the fixed constituent data objects and the variable constituent data objects. In the example of FIG. 3, the method begins with obtaining a set of data objects [block 300]. Each data object of the plurality of objects is then separated or partitioned into the fixed constituent data objects and the variable constituent data objects [block 302]. In other cases, the fixed constituent data objects and the variable constituent data objects may be obtained directly, e.g., by accessing a memory in which data indicative of the constituent data objects is stored or by receiving such data from sources thereof.

Each fixed constituent data object is allocated to one of a plurality of fixed groups [block 304]. The allocation or grouping may be based on attributes of the constituent data objects, such as end date, phase, calendar, etc. The fixed constituent data objects in each fixed group of the plurality of fixed groups accordingly have a common set of properties. Within each fixed group, a net magnitude is determined [block 306].

Each variable constituent data object is allocated to one of a plurality of variable groups [block 308]. As with the fixed groups, the allocation or grouping may be based on attributes of the constituent data objects, such as end date, phase, calendar, etc. The variable constituent data objects in each fixed group of the plurality of fixed groups also have a common set of properties. Within each variable group, a net magnitude is determined [block 310].

An accumulated or otherwise historical component for each variable constituent data object is determined [block 312]. A net historical magnitude is then determined for each variable group of the plurality of variable groups based on the historical components of the variable constituent data objects in the variable group [block 314].

One or more representative data objects are created or otherwise defined to represent the fixed and variable constituent data objects in a pair of matching groups [block 316]. The representative data object(s) thus maintain the net magnitudes of the fixed group and the variable group, and maintain the net historical magnitude of the variable group. The pair of matching groups have a matching common set of properties (e.g., end date, etc.).

In some cases, the representative data object(s) are defined via implementation of an optimization procedure. In coupon blending and other applications, the optimization may be configured (e.g., pre-configured or configured during the method) in accordance with one or more constraints. For instance, one or more constraints may relate to keeping a central controller (e.g., a CCP) risk neutral. Other constraints may allow other parties a predetermined amount of fluctuation (e.g., a risk tolerance level).

The representative data object(s) defined via the optimization may then be incorporated into the set of data objects to effectuate adjustments to the set of data objects. In the example of FIG. 3, the adjustments are stored in a memory or data store [block 318]. In some cases, the adjustments may be effectuated via execution or cancellation of trades.

The order of the acts or steps of the operation may vary from the example shown. For example, the net magnitude determinations may be implemented concurrently. Similarly, the grouping or allocation of the constituent data objects may be implemented concurrently.

Additional, fewer, or alternative acts may be implemented. For example, one or more acts may be directed to transmission of the representative data object(s) to effectuate the adjustments to the set of data objects.

Figure 4:
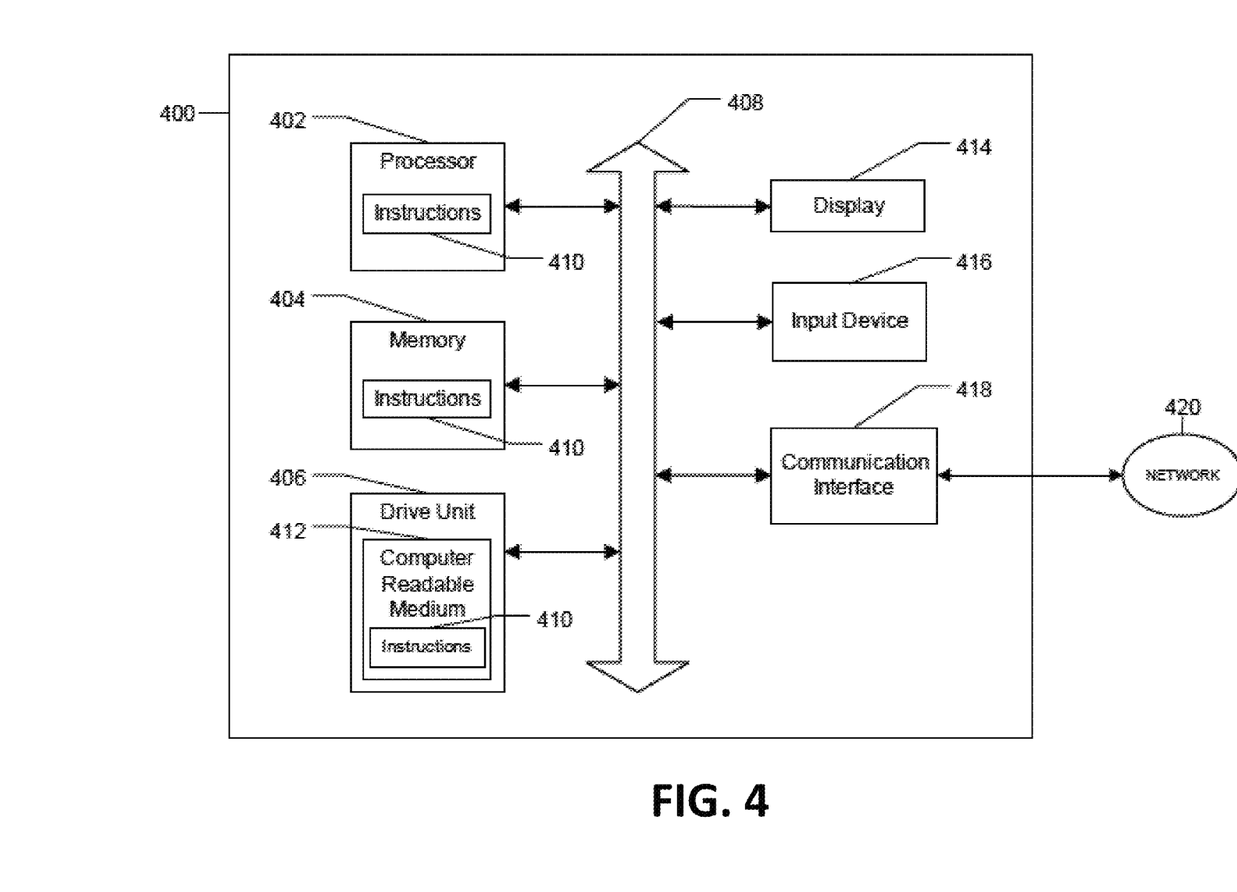
FIG. 4 shows an illustrative embodiment of a general computer system for use in or with the examples of FIGS. 1-3.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate with a drive unit 406 and other components of the system 400 via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 404 is operable to store instructions 410 executable by the processor 402. The functions, acts or tasks illustrated in the figures or described herein may be performed by the programmed processor 402 executing the instructions 410 stored in the memory 404. The instructions 410 may be loaded or accessed from a computer-readable storage medium 412 in the drive unit 406 or other data storage device. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include an optical or other disk drive unit as the drive unit 406. The disk drive unit 406 may include the computer-readable storage medium 412 in which one or more sets of instructions 410, e.g. software, can be embedded. Further, the instructions 410 may embody one or more of the methods or logic as described herein. In a particular embodiment, the instructions 410 may reside completely, or at least partially, within the memory 404 and/or within the processor 402 during execution by the computer system 400. The memory 404 and the processor 402 also may include computer-readable storage media as discussed above.

The present disclosure contemplates a computer-readable medium that includes instructions 410 or receives and executes instructions 410 responsive to a propagated signal, which may be received via a communication interface 418. The system 400 may be connected to a network 420 to communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Figure 5:
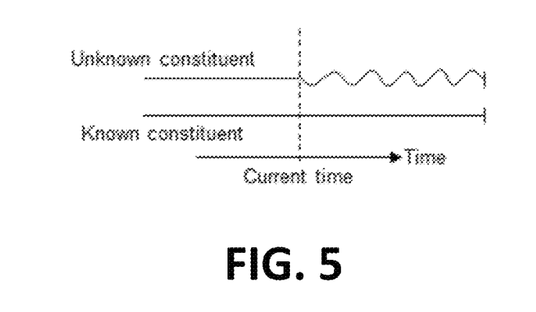
FIG. 5 depicts an example of known (or fixed) and unknown (or variable) constituent data objects of a data object.

FIG. 5 depicts a non-periodic transaction or other data object in accordance with one example. The non-periodic transaction includes two constituent data objects. One constituent data object has a known or otherwise fixed magnitude. For example, the fixed constituent data object may correspond with the fixed leg of a BRL swap.

The known amount of this fixed constituent data object may depend on the start date, the end date, a notional magnitude (notional) and a rate magnitude (e.g., a fixed rate). The rate magnitude is known at the beginning of the transaction and is fixed, i.e., will not change over time, as indicated by a flat line both and after the current time.

In the example of FIG. 5, the data object includes an unknown or variable constituent data object. The variable constituent has an unknown magnitude up until the last date of the transaction, but, in this example, accumulates volatile or variable records over the length of the transaction. These records are volatile or variable in the sense that, at a certain point in time, the past records have known rate magnitudes (resets) and future records have unknown rate magnitudes. The variable constituent data object may be, for example, a float leg of a BRL swap. At each point in time, the collection of past records makes up the current state, accumulated rate, for the variable constituent data object of the transaction, and the collection of future records makes up an unknown path with which the accumulated rate will follow. At the end of the transaction, the final accumulated rate will at last be known, insofar as there are no more future, volatile records to collect. The final magnitude of this variable constituent data object may thus be dependent on the start date, end date and notional of the transaction.

Past compression techniques allocated variable constituent data objects to groups such that each variable constituent data object in a respective group had a common start date and a common end date. The disclosed methods and systems remove the limitation of a common start date on the allocation or groups underlying the compression.

Figure 6:
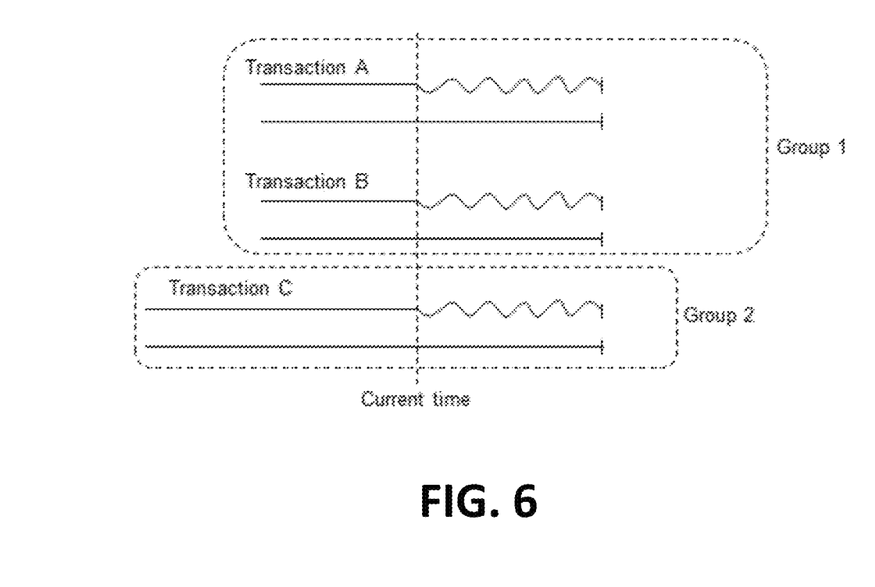
FIG. 6 depicts the allocation of variable constituent data objects to variable groups having a common set of properties in accordance with one example.

FIG. 6 illustrates the dependency on start dates for past compression techniques relative to the lack of such dependency in the disclosed methods and systems. Transactions A, B and C may have a number of attributes in common, including a common end date. The transactions may also have different notional and fixed rates. However, only transactions A and B will reside in the same group in past compression techniques because only transactions A and B have the same start date.

One example of a traditional risk-free netting or multilateral compression process can be expressed as follows:

$\Sigma N_i r_i = Nr$, for each known group $\Sigma N_i u = Nu$, for each unknown group where $N_i r_i$ is the product between the notional and fixed rate of a transaction in a known constituent group and $Nr$ is the net known magnitude of the same group, and $N_i$, is the notional of a transaction in an unknown constituent group, u is the unknown accumulating floating rate and N is the net notional of the same group. These expressions establish that the net positions before and after the process stay the same, as in, e.g., a risk-free compression procedure.

The unknown groups are configured such that they all have a common unknown final accumulated rate u which can be eliminated from the second expression. This returns the equalities used in the optimization procedure:

$\Sigma N_i r_i = Nr$, for each known group $\Sigma N_i = N_i$, for each unknown group The disclosed methods and systems utilize the realization that the unknown, final accumulated rate may be split into known and unknown components. By splitting the accumulated rate as such, transactions differing in accumulated rate may have common future unknown rates but differing known rates (in the case of transactions with differing start dates). This observation can accordingly be used to remove the dependency on the start date when grouping the unknown or variable constituent data objects. For instance, in a BRL zero coupon swap, the accumulated rate may correspond with the collected, known volatile records multiplied by the future, unknown volatile records. All unknown or variable constituent data objects, with the same attributes and end date, will follow the same volatile path to the end date, which means that an unknown group is a net, current accumulated amount which will follow that volatile path. The accumulation of the disclosed methods and systems makes it possible to express the historical component of the variable constituent data objects using the transactions for a compression process, for example with BRL zero coupon swaps or inflation swaps, and thus remove the dependency on the start dates of the transactions.

For example, the amount of an unknown constituent of a BRL zero coupon swap may be expressed as follows:

$$N\left(\prod_{d=t_0}^{t}(1+r_d) - 1\right)$$

where N is the notional of the transaction, $r_d$ is a volatile record, t is the end date and $t_0$ is the start date of the transaction. The expression thus shows how the start date contributes to the amount at the end date.

The product of $(1+r_i)$ may be used to represent the accumulated rate for the transaction. At a time n, the payoff may be expressed as:

$$N\left(\prod_{d=t_0}^{n}(1+r_d)\prod_{d=n+1}^{t}(1+r_d) - 1\right)$$

which may also be expressed as follows:

$N_i r_i^k r^u - N_i$ where i represents a certain transaction, $r_i^k$ is the known part of the accumulated rate for this transaction and $r^u$ is the future path for the accumulated rate to the end date, or in other words the accumulated, unknown, volatile future records. Note that $r^u$ is not dependent on i, but is common for all transactions with the same end date.

It should be noted that the known or fixed constituent data objects are not dependent on the start date of the transactions. Each fixed constituent data object is already known from the start date. It follows that the fixed constituent data objects can be grouped without taking start date into account by expressing the net known amount as a known amount instead of, e.g., a product between notional and fixed rate.

The following expressions may be derived for the fixed and variable groups:

$$\sum A_i = A_i, \text{ for each known group}$$
$$\sum N_i r_i^k r^u - N_i = N_r^k r^a - N, \text{ for each unknown group}$$

where $r^k$ is the average, notional-weighted accumulated rate, which multiplied with the net N is the total accumulated amount, and $A_i$ is the known amount per known constituent and A is the net known amount. The above expressions may be re-written as follows by separating the second expression into 2 independent expressions:

$$\sum A_i = A, \text{ for each known group}$$
$$\sum N_i = N, \text{ for each unknown group}$$
$$\sum N_i r_i^k r^u = N_r^k r^u, \text{ for each unknown group}$$

The volatile component $r^u$ appears on both sides of the last expression and can thus be eliminated to derive the following expressions to be solved or addressed via, e.g., the optimization:

$$\sum A_i = A, \text{ for each known group}$$
$$\sum N_i = N, \text{ for each unknown group}$$
$$\sum N_i r_i^k = N_r^k, \text{ for each unknown group}$$

The foregoing expression shows how the grouping of transaction constituents is no longer dependent upon start date, which results in less fragmentation of the constituent data objects. In the example of FIG. 6, all of the transactions A, B, and C would reside in the same variable group.

As mentioned previously, the disclosed methods and systems may be applied to other financial products, such as a zero coupon inflation-indexed swap. The known or fixed constituent of an inflation swap is also known at all times and will not change. So the fixed constituent may be handled in the same way as the known constituent of a BRL swap. The payoff of an unknown constituent of an inflation swap may be expressed as follows:

$$N_i \left( \frac{FF}{IF_i} - 1 \right)$$

where $IF_i$ is the initial CPI reading (or fixing) for the transaction, and FF is the final CPI reading (or fixing) at the end of the transaction.

The expression may be written as follows:

$$N_i \left( \frac{CF}{IF_i} \frac{FF}{CF} - 1 \right)$$

where CF is the CPI reading (or fixing) at the current time. The first ratio of CPI fixings is thus a known rate and the second ratio is a volatile or variable rate.

With the foregoing expressions in hand, the inflation swap can be shown to present the following expressions for the optimization:

$$\sum A_i = A, \text{ for each known group}$$
$$\sum N_i = N, \text{ for each unknown group}$$
$$\sum \frac{N_i}{IF_i} = \frac{N}{IF}, \text{ for each unknown group}$$

which similarly remove the dependency on start date in, e.g., a risk-free netting or other compression of the inflation swaps. IF is the average, notional-weighted initial CPI reading (or fixing).

Figure 7:
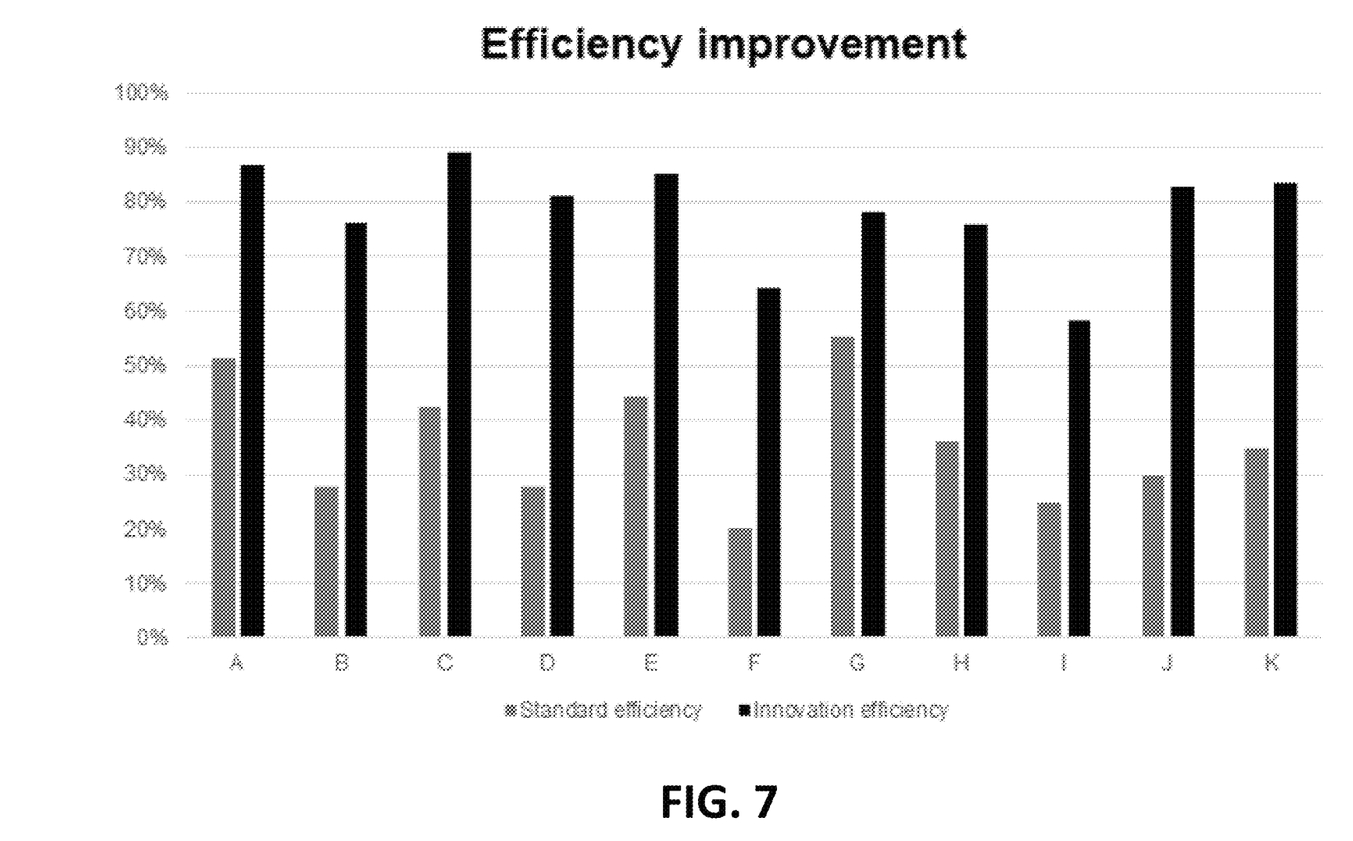
FIG. 7 depicts a graphical plot of efficiency improvements in compression of data objects in accordance with one example.

FIG. 7 illustrates the efficiency improvements resulting from a test implementation of one example of the disclosed methods and systems. The graphical plot shows a significant increase in the number of transactions that were removed as a result of a multi-lateral compression. The efficiency improvement is presented as a ratio of total notional per account available for compression.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system for processing a set of data objects, each data object of the set of data objects specifying a fixed constituent data object and a variable constituent data object, the system comprising:
   a processor;
   a memory coupled with the processor;
   first logic stored in the memory and executable by the processor to cause the processor to obtain the fixed constituent data object and the variable constituent data object for each data object of the set of objects;

second logic stored in the memory and executable by the processor to cause the processor to analyze the fixed constituent data objects to allocate each fixed constituent data object to one of a plurality of fixed groups, the fixed constituent data objects in each fixed group of the plurality of fixed groups having a common set of properties;

third logic stored in the memory and executable by the processor to cause the processor to analyze the variable constituent data objects to allocate each variable constituent data object to one of a plurality of variable groups, the variable constituent data objects in each variable group of the plurality of variable groups having a common set of properties;

fourth logic stored in the memory and executable by the processor to cause the processor to determine a net magnitude for each fixed group of the plurality of fixed groups and for each variable group of the plurality of variable groups;

fifth logic stored in the memory and executable by the processor to cause the processor to determine a historical component for each variable constituent data object;

sixth logic stored in the memory and executable by the processor to cause the processor to determine a net historical magnitude for each variable group of the plurality of variable groups based on the historical components of the variable constituent data objects in the variable group; and seventh logic stored in the memory and executable by the processor to cause the processor to define at least one representative data object to represent the fixed and variable constituent data objects in each pair of fixed and variable groups having a matching common set of properties, the at least one representative data object maintaining the net magnitudes of the fixed group and the variable group and maintaining the net historical magnitude of the variable group.

2. The system of claim 1, wherein at least one of the variable groups comprises first and second variable constituent data objects having different start dates.

3. The system of claim 1, wherein the seventh logic is configured to further cause the processor to implement an optimization procedure to define the at least one representative data object for each pair of fixed and variable groups.

4. The system of claim 1, wherein the common set of properties comprises a common end date.

5. The system of claim 1, wherein the fifth logic is configured to further cause the processor to determine the historical component for each variable constituent data object based on a series of data events since a start date of the data object.

6. The system of claim 5, wherein each data event in the series of data events establishes a rate magnitude.

7. The system of claim 6, wherein the rate magnitude is an interest rate.

8. The system of claim 1, wherein the historical component is representative of a data event occurring on a start date of the data object.

9. The system of claim 8, wherein the data event establishes an index magnitude.

10. The system of claim 9, wherein the index magnitude is an inflation index.

11. The system of claim 1, wherein the fourth logic is configured to further cause the processor to determine, for each fixed group, a magnitude for each fixed constituent data object in the fixed group based on a notional transactional level for the fixed constituent data object and a coupon rate for the fixed constituent data object.

12. The system of claim 1, wherein the fourth logic is configured to further cause the processor to determine, for each variable group, a magnitude for each variable constituent data object in the fixed group based on a notional transactional level for the variable constituent data object.

13. The system of claim 1, wherein the seventh logic is configured to further cause the processor to define the at least one representative data object such that the at least one representative data object has a cumulative fixed magnitude, a cumulative variable magnitude, and a cumulative historical magnitude equal to the net magnitude of the fixed group, the net magnitude of the variable group, and the net historical magnitude of the variable group, respectively.

14. The system of claim 1, wherein the seventh logic is configured to further cause the processor to define the at least one representative data object such that the at least one representative data object has a cumulative fixed magnitude and a cumulative variable magnitude such that future net magnitudes of the fixed group and the variable group are replicated by the at least one representative data object.

15. The system of claim 1, further comprising eighth logic stored in the memory and executable by the processor to cause the processor to store the at least one representative data object in a data store as an adjustment to the set of data objects such that a number of data objects in the set of data objects is reduced.

16. The system of claim 1, wherein each data object of the set of data objects has a start timing, an end timing, and an event timing.

17. The system of claim 16, wherein the common set of properties comprises the end timing and the event timing.

18. The system of claim 1, wherein the at least one representative data object comprises multiple data objects that cumulatively maintain the net magnitudes of the fixed group and the variable group and maintaining the net historical magnitude of the variable group.

19. The system of claim 1, wherein each data object of the set of data objects comprises data representative of a trade involving an exchange of cash flows, such that each fixed constituent data object and each variable constituent data object is representative of a leg of the exchange of cash flows.

20. A computer-implemented method for processing a set of data objects, each data object of the set of data objects comprising a fixed constituent data object and a variable constituent data object, the method comprising:

allocating, by a processor, each fixed constituent data object to one of a plurality of fixed groups, the fixed constituent data objects in each fixed group of the plurality of fixed groups having a common set of properties;

allocating, by the processor, each variable constituent data object to one of a plurality of variable groups, the variable constituent data objects in each variable group of the plurality of variable groups having a common set of properties;

determining, by the processor, a net magnitude for each fixed group of the plurality of fixed groups and for each variable group of the plurality of variable groups;

determining, by the processor, a historical component for each variable constituent data object;

determining, by the processor, a net historical magnitude for each variable group of the plurality of variable groups based on the historical components of the variable constituent data objects in the variable group;

implementing, by the processor, an optimization to define at least one representative data object to represent the fixed and variable constituent data objects in each pair of fixed and variable groups having a matching common set of properties, the at least one representative data object maintaining the net magnitudes of the fixed group and the variable group and maintaining the net historical magnitude of the variable group; and storing, by the processor, the at least one representative data object in a data store as an adjustment to the set of data objects such that a number of data objects in the set of data objects is reduced.

21. A computer program product for processing a set of data objects, each data object of the set of data objects specifying a fixed constituent data object and a variable constituent data object, the computer program product comprising one or more non-transitory computer-readable storage media having stored thereon computer-executable instructions that, when executed by one or more processors of a computing system, cause the computing system to perform a method, the method comprising:

allocating each fixed constituent data object to one of a plurality of fixed groups, the fixed constituent data objects in each fixed group of the plurality of fixed groups having a common set of properties;

allocating each variable constituent data object to one of a plurality of variable groups, the variable constituent data objects in each variable group of the plurality of variable groups having a common set of properties;

determining a net magnitude for each fixed group of the plurality of fixed groups and for each variable group of the plurality of variable groups;

determining a historical component for each variable constituent data object;

determining a net historical magnitude for each variable group of the plurality of variable groups based on the historical components of the variable constituent data objects in the variable group;

implementing an optimization to define at least one representative data object to represent the fixed and variable constituent data objects in each pair of fixed and variable groups having a matching common set of properties, the at least one representative data object maintaining the net magnitudes of the fixed group and the variable group and maintaining the net historical magnitude of the variable group; and storing the at least one representative data object in a data store as an adjustment to the set of data objects such that a number of data objects in the set of data objects is reduced.

22. A system for processing a set of data objects, each data object of the set of data objects specifying a fixed constituent data object and a variable constituent data object, the system comprising:

means for allocating each fixed constituent data object to one of a plurality of fixed groups, the fixed constituent data objects in each fixed group of the plurality of fixed groups having a common set of properties;

means for allocating each variable constituent data object to one of a plurality of variable groups, the variable constituent data objects in each variable group of the plurality of variable groups having a common set of properties;

means for determining a net magnitude for each fixed group of the plurality of fixed groups and for each variable group of the plurality of variable groups;

means for determining a historical component for each variable constituent data object;

means for determining a net historical magnitude for each variable group of the plurality of variable groups based on the historical components of the variable constituent data objects in the variable group;

means for implementing an optimization to define at least one representative data object to represent the fixed and variable constituent data objects in each pair of fixed and variable groups having a matching common set of properties, the at least one representative data object maintaining the net magnitudes of the fixed group and the variable group and maintaining the net historical magnitude of the variable group; and means for storing the at least one representative data object in a data store as an adjustment to the set of data objects such that a number of data objects in the set of data objects is reduced.

* * * * *